Figure 1:
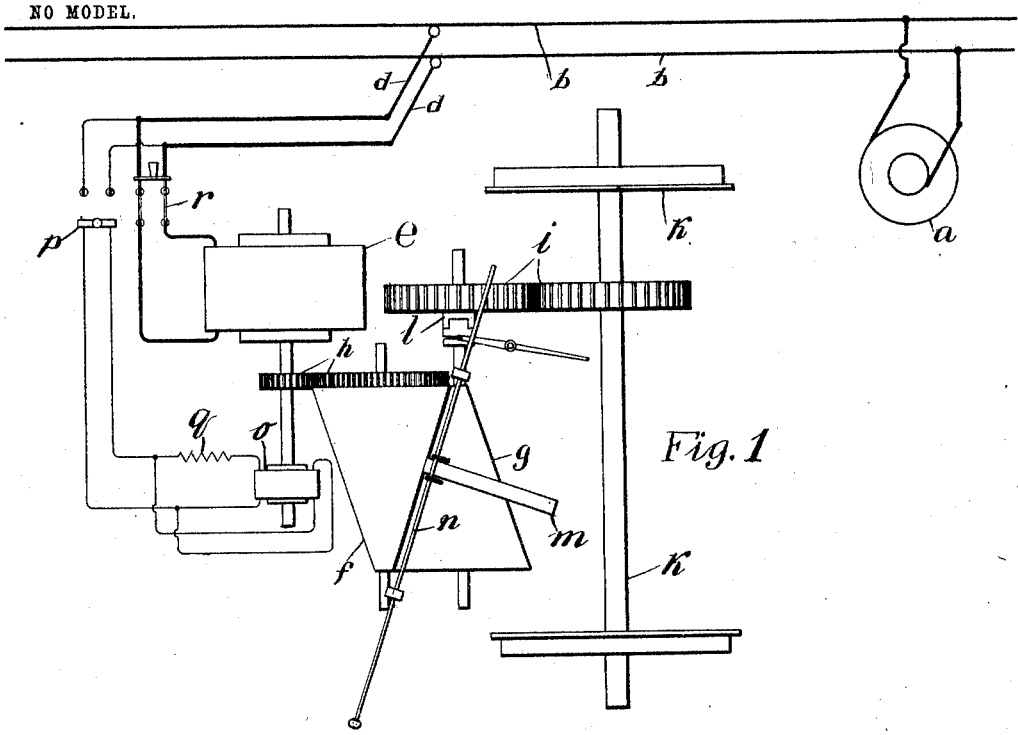

No. 759,241. PATENTED MAY 10, 1904.
G. L. CRAGG.
ELECTRIC RAILWAY SYSTEM.
APPLICATION FILED MAY 22, 1902.
NO MODEL.

Witnesses:
Lynn A. Williams
Harvey L. Hanson.

Inventor:
George L. Cragg.
By Charles A. Brown & Cragg
Attorneys.

No. 759,241. Patented May 10, 1904.

UNITED STATES PATENT OFFICE.

GEORGE L. CRAGG, OF CHICAGO, ILLINOIS, ASSIGNOR TO BION J. ARNOLD, OF CHICAGO, ILLINOIS.

ELECTRIC-RAILWAY SYSTEM.

SPECIFICATION forming part of Letters Patent No. 759,241, dated May 10, 1904.

Application filed May 22, 1902. Serial No. 108,542. (No model.)

*To all whom it may concern:*

Be it known that I, GEORGE L. CRAGG, a citizen of the United States, residing at Chicago, in the county of Cook and State of Illinois, have invented a certain new and useful Improvement in Electric-Railway Systems, (Case No. 9,) of which the following is a full, clear, concise, and exact description, reference being had to the accompanying drawings, forming a part of this specification.

My invention relates to electric-railway systems, and has for its object the provision of means whereby single-phase alternating current may be employed in effecting travel of electric-railway vehicles and whereby single-phase alternating-current supply-circuits may be extended along the line of travel to effect the operation of vehicles.

As is well known, the most effective form of motor for the purpose of transferring power and adapted for operation by single-phase alternating current is a motor which in itself is not capable of effectively operating a vehicle at varying rates of speed, which are required in actual practice when such motors have unchangeable-speed connection with the running-gear, being a motor, such as a synchronous motor or a lag-motor, having practically uniform rate of speed when most effective. In other words, the motor which is best adapted for the translation of power furnished by single-phase supply-circuits is a single-phase motor as distinguished from a split-phase motor. Polyphase motors would furnish the necessary power, obviously; but such motors would need to be supplied by polyphase distribution-circuits.

In practicing my invention I interpose a variable gear or speed connection between the motor and the running-gear and provide, in combination with such variable gear, a motor means whereby the motor may be started, making thus a most effective combination which will adapt single-phase motors for use as traction-motors.

In my present invention I provide a supplemental split-phase motor adapted to receive out-of-phase currents supplied by the single-phase trolley-circuit, which may be connected or associated with this trolley-circuit whenever the single-phase motor is to be brought to speed and which is dissociated from the motor when the motor has reached a sufficient speed for its unaided operation. When the single-phase motor is to be started, I preferably relieve it of operative connection with the vehicle running-gear to relieve the split-phase motor of the load of the single-phase motor, so that the split-phase motor may readily bring the single-phase motor to speed. After the single-phase motor has been brought to the requisite speed it may then be coupled with the vehicle running-gear, preferably by means of some suitable clutching mechanism. Any suitable form of variable gear may be interposed between the single-phase motor and the running-gear of the vehicle.

I will explain my invention more fully by reference to the accompanying drawings, in which—

Figure 2:
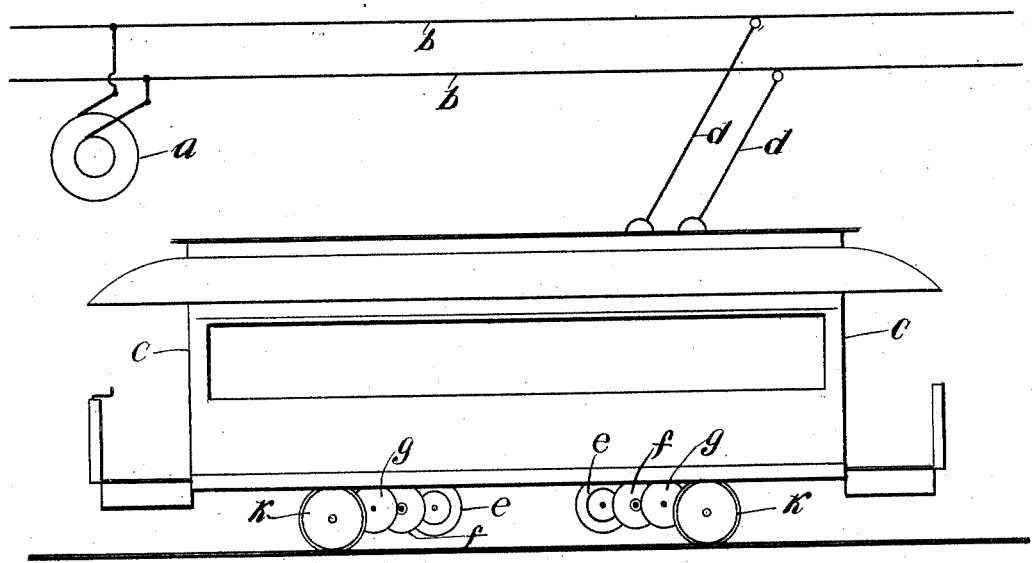

Figure 1 is a diagrammatic view of the operating mechanism upon a vehicle embodying my invention. Fig. 2 is a more general view diagrammatically indicating a vehicle and elements of my invention in place thereupon.

Like parts are indicated by similar characters of reference in both views.

I have illustrated a source of single-phase alternating current $a$, connected with a supply-circuit whose mains $b\ b$ are illustrated in the form of trolley-wires extending along the line of travel. The car or other vehicle $c$ is provided with trolleys $d\ d$ or other suitable means of connection with the supply-circuit or equivalent means for receiving current in any manner from the supply-circuit. These trolleys or equivalent devices are connected in circuit with a single-phase motor $e$, provided upon the car, the motor in this particular instance being a lag-motor, though I do not wish to be limited to a motor of this kind. The single-phase motor operates some suitable form of variable-speed gear, that illustrated comprising a pair of cones $f$ and $g$, gearing $h$ intervening between the cone $f$ and the shaft of the motor $e$, while gearing $i$ intervenes between the cone $g$ and the running-gear $k$ of the vehicle. The pinion upon the shaft or cone $g$ is loose thereon and has secured thereto one member of a clutch $l$, the other member being splined upon the said shaft, so that when the members of the clutch are out of engagement the cone $g$ may rotate without operating the gearing $i$; but when the clutch members are in engagement a rotation of the cone $g$ will cause an operation of the gearing $i$. When the members of the clutch are locked together, the speed of the gearing $i$, and consequently the running-gear of the vehicle, may vary with respect to the speed of the motor $e$ and cone $f$ by an adjustment of the belt $m$ toward or from the apex of a cone, which adjustment may be effected by a belt-shifter $n$. If the single-phase motor is to be started, the members of the clutch $l$ are separated, so as to relieve the motor of load, whereupon the split-phase motor $o$ may be operated to bring the single-phase motor to proper speed. A switch $p$ is provided for connecting the split-phase motor with the trolley-circuit, the switch $p$ being located upon the vehicle and serving, preferably, conductively to close the conductors extending to the trolley poles or contacts from the motor. The working circuits of the motor are connected with the two conductors extending to the trolley-contacts, being in multiple with respect to each other, the characteristics of the working circuits of the motor being different, whereby the currents therein may be caused to be out of phase. For this purpose one of the working circuits of the motor may have a specially-provided phase-modifier $q$. It is desirable to open the working circuit of the single-phase motor when the split-phase motor is bringing the single-phase motor to a sufficient speed, for which purpose a switch $r$ may be provided upon the vehicle. When the switch $p$ has been closed, the switch $r$ opened, and the gearing or other variable-speed connection between the single-phase motor and the running-gear of the vehicle is broken, the said single-phase motor may readily be brought to speed.

I have not deemed it essential to illustrate the details of construction of the motors, as such construction will be apparent to any electrical engineer, nor do I wish to be limited to the mechanical features illustrated, as it is obvious that many changes may be made in the embodiment of the invention shown without departing from its spirit.

Having thus described my invention, I claim as new and desire to secure by Letters Patent—

1. In an electric-railway system, the combination with a source of single-phase current, of a circuit supplied thereby extending along the line of travel, a vehicle, an alternating-current single-phase motor carried by the vehicle, an electric motor carried upon the vehicle for starting the single-phase motor, a variable-gear connection between the single-phase motor and the running-gear of the vehicle, and means whereby the gear connection between the single-phase motor and the running-gear of the vehicle may be broken, substantially as described.

2. In an electric-railway system, the combination with a source of single-phase current, of a circuit supplied thereby extending along the line of travel, a vehicle, an alternating-current single-phase motor carried by the vehicle, an electric motor carried upon the vehicle for starting the single-phase motor, and a variable-speed connection between the single-phase motor and the running-gear of the vehicle, substantially as described.

3. In an electric-railway system, the combination with a source of single-phase current, of a circuit supplied thereby extending along the line of travel, a vehicle, an alternating-current single-phase motor carried by the vehicle, a split-phase motor carried upon the vehicle for starting the single-phase motor, means whereby the split-phase motor may be charged with out-of-phase currents occasioned by the single-phase current in the single-phase supply-circuit, a variable-gear connection between the single-phase motor and the running-gear of the vehicle, and means whereby the gear connection between the single-phase motor and the running-gear of the vehicle may be broken, substantially as described.

4. In an electric-railway system, the combination with a source of single-phase current, of a circuit supplied thereby extending along the line of travel, a vehicle, an alternating-current single-phase motor carried by the vehicle, a split-phase motor carried upon the vehicle for starting the single-phase motor, means whereby the split-phase motor may be charged with out-of-phase currents occasioned by the single-phase current in the single-phase supply-circuit, and a variable-speed connection between the single-phase motor and the running-gear of the vehicle, substantially as described.

In witness whereof I hereunto subscribe my name this 7th day of May, A. D. 1902.

GEORGE L. CRAGG.

Witnesses:
FLORENCE WICKLIN,
JOHN STAHR.